United States Patent
Jiang

(10) Patent No.: US 12,262,143 B2
(45) Date of Patent: Mar. 25, 2025

(54) VIDEO CONFERENCE PRESENTATION METHOD AND APPARATUS, AND TERMINAL DEVICE AND STORAGE MEDIUM

(71) Applicant: BEIJING ZITIAO NETWORK TECHNOLOGY CO., LTD., Beijing (CN)

(72) Inventor: Ruolei Jiang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/210,066

(22) Filed: Jun. 14, 2023

(65) Prior Publication Data

US 2023/0328205 A1    Oct. 12, 2023

Related U.S. Application Data

(63) Continuation of application No. PCT/CN2021/132064, filed on Nov. 22, 2021.

(30) Foreign Application Priority Data

Dec. 18, 2020   (CN) .......................... 202011511897.6

(51) Int. Cl.
H04N 7/15      (2006.01)
G06F 3/0484    (2022.01)

(52) U.S. Cl.
CPC ............. *H04N 7/15* (2013.01); *G06F 3/0484* (2013.01)

(58) Field of Classification Search
None
See application file for complete search history.

(56) References Cited

U.S. PATENT DOCUMENTS 9,264,660 B1      2/2016  Petterson et al.
9,843,606 B1 *   12/2017  Vendrow ............. H04L 12/1818
10,021,348 B1    7/2018  Imai et al.
(Continued)

FOREIGN PATENT DOCUMENTS

CN    104010158 A    8/2014
CN    104539815 A    4/2015
(Continued)

OTHER PUBLICATIONS

International Patent Application No. PCT/CN2021/132064; Int'l Search Report; dated Jan. 25, 2022; 3 pages.
(Continued)

*Primary Examiner* — Stella L. Woo
(74) *Attorney, Agent, or Firm* — BakerHostetler

(57) ABSTRACT

The disclosure provides a video conference presentation method and apparatus, a terminal device and a storage medium. When content is shared during a video conference, a participant multimedia display area selected for amplified presentation and a shared content display area interchange presented contents mutually, such that interaction modes between users and terminal devices in a video conference are enriched, an interaction path is shorter to be more conformable to the intuition of users, and the participant multimedia data is less affected, thereby reducing disturbance to users, and improving users' visual perception for an entire interface.

9 Claims, 6 Drawing Sheets

(56) References Cited

U.S. PATENT DOCUMENTS

| | | |
|---|---|---|
| 2009/0037827 A1 | 2/2009 | Bennetts |
| 2013/0198629 A1* | 8/2013 | Tandon ................. H04L 65/765 |
| | | 715/716 |
| 2017/0187776 A1* | 6/2017 | Pell ....................... H04L 65/765 |
| 2017/0280098 A1* | 9/2017 | Sethuraman ........ H04L 12/1827 |
| 2018/0196583 A1* | 7/2018 | Astavans ............... H04N 7/152 |
| 2018/0203577 A1 | 7/2018 | Astavans et al. |
| 2018/0249113 A1* | 8/2018 | Faulkner ................ H04N 7/15 |

FOREIGN PATENT DOCUMENTS

| | | |
|---|---|---|
| CN | 107357585 A | 11/2017 |
| CN | 109951673 A | 6/2019 |
| CN | 111258521 A | 6/2020 |
| CN | 111770303 A | 10/2020 |
| CN | 112804473 A | 5/2021 |

OTHER PUBLICATIONS

Notice of Reasons for Refusal for Japanese Application No. 2023-536067, mailed Dec. 24, 2024, 10 pages.

* cited by examiner

VIDEO CONFERENCE PRESENTATION METHOD AND APPARATUS, AND TERMINAL DEVICE AND STORAGE MEDIUM

CROSS REFERENCE TO RELATED APPLICATIONS

The disclosure is a continuation of PCT application Ser. No. PCT/CN2021/132064, titled "VIDEO CONFERENCE PRESENTATION METHOD AND APPARATUS, AND TERMINAL DEVICE AND STORAGE MEDIUM", filed on Nov. 22, 2021, which claims priority to Chinese Patent Application No. 202011511897.6, field on Dec. 18, 2020, titled "VIDEO CONFERENCE PRESENTATION METHOD AND APPARATUS, AND TERMINAL DEVICE AND STORAGE MEDIUM", the entire contents of both of which are incorporated herein by reference.

FIELD

Embodiments of the disclosure relate to the field of video conference technology, in particular to a video conference presentation method and apparatus, a terminal device and a storage medium.

BACKGROUND

A video conference refers to an interaction mode in which users perform real-time video and/or voice interactions through terminal devices and a network. Relevant video conferences mostly provide a content sharing function. After the content sharing function is initiated, shared content is mostly presented in a designated region in a terminal device (e.g., presented in a lower left region of a screen), and participant videos of participants are presented in other regions, the areas of which are smaller than that of the designated region corresponding to the shared content.

SUMMARY

Embodiments of the disclosure propose a video conference presentation method and apparatus, a terminal device and a storage medium.

The first aspect of the disclosure provides a video conference presentation method, comprising: in response to detecting a predefined pinning operation on a target participant display area in a preset number of participant display areas in a video conference interface, performing a display area switching operation as follows: presenting, in the target participant display area, content presented in a preset shared content display area in the video conference interface; and presenting, in the preset shared content display area, content presented in the target participant display area.

The second aspect of the disclosure provides a video conference presentation apparatus, comprising: a pinning unit configured to, in response to detecting a predefined pinning operation on a target participant display area of a preset number of participant display areas in a video conference interface, perform a display area switching operation as follows: presenting, in the target participant display area, content presented in a preset shared content display area in the video conference interface; and presenting, in the preset shared content display area, content presented in the target participant display area.

The third aspect of the disclosure provides a terminal device, comprising: at least one processor; and at least one memory storing instructions that upon execution by the at least one processor cause the at least one processor to perform the method provided in any embodiment of the first aspect.

The fourth aspect of the disclosure provides a computer readable storage medium with a computer program, storing program instructions that upon execution by one or more processors, cause the one or more processors to perform the method provided in any embodiment of the first aspect.

According to the video conference presentation method and apparatus, the terminal device and the storage medium provided in the embodiments of the disclosure, when content is shared during a video conference, the content presented in a selected participant display area and a content presented in a shared content display area are interchanged mutually, such that interaction between users and terminal devices in a video conference are enriched.

BRIEF DESCRIPTION OF THE DRAWINGS

Other features, objectives and advantages of the disclosure will become more apparent by reading the detailed description of the non-restrictive embodiments with reference to the following drawings. The drawings are for the purpose of illustrating specific implementations only and are not considered as limiting the disclosure. In the drawings.

DETAILED DESCRIPTION OF THE EMBODIMENTS

Figure 1A:
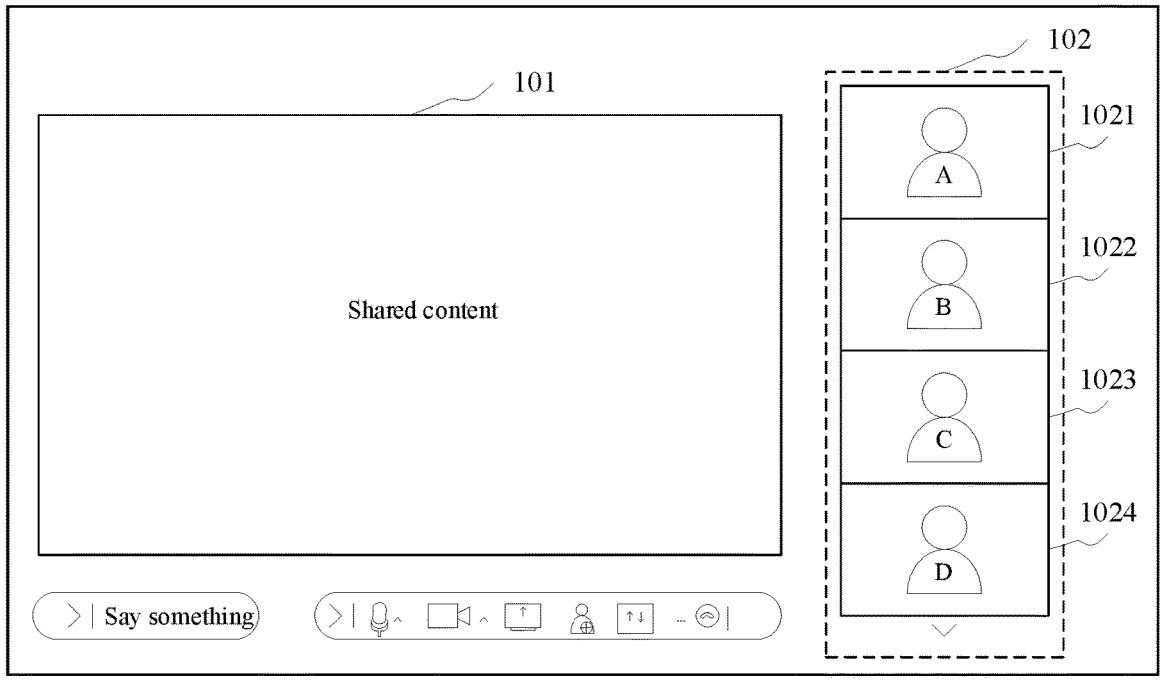
FIGS. 1A and 1B are schematic diagrams of an application scenario of a video conference presentation method in the prior art.

The disclosure is further described in detail below in conjunction with the drawings and embodiments. It can be understood that specific embodiments described herein are only used for explaining the related disclosure, rather than limiting the disclosure. In addition, it is also to be noted that, for convenience of description, only parts related to the disclosure are shown in the drawings.

It is to be noted that the embodiments in the disclosure and features in the embodiments can be combined with each other without conflicts. The disclosure will be described in detail below with reference to the drawings in conjunction with the embodiments.

Figure 1B:
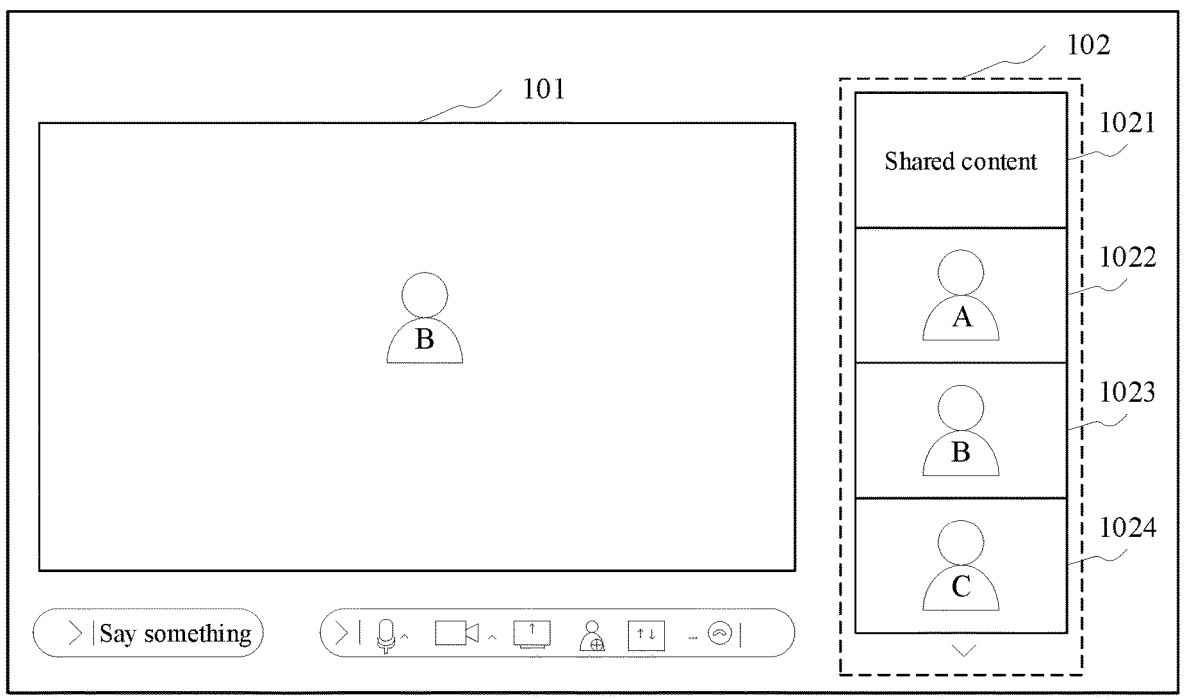

If a user shares content in a video conference, a screen is usually divided into a shared content display area with a relatively large area and participant display areas with relatively small areas. A shared content video stream is displayed in the shared content display area, and multimedia data of participants (e.g., participant video streams or participant avatars) are displayed in the participant display areas. At present, the video conference also provides a function such that when a user selects multimedia data of a participant, the selected multimedia data of the participant will be presented in a shared content display area where the shared content was presented originally, while an independent region will be designated within the participant display area to present the shared content, and participant display areas displaying multimedia data of participants will be occupied accordingly, such that the multimedia data of the participants being presented is different before and after being selected. As shown in FIG. 1A, shared content is displayed in an area 101, and participant multimedia data of four participants A, B, C and D are respectively displayed in participant display areas 1021, 1022, 1023 and 1024 within an area 102. When a user selects the area 1022 where the multimedia data of the participant B is displayed, as shown in FIG. 1B, the multimedia data of the participant B will be displayed in the area 101, and the shared content will be displayed in a designated area 1021 in the participant display area 102. The original display areas for displaying participant multimedia data of the participants A, B, C and D will be squeezed down accordingly, i.e., the participant multimedia data of the participants A, B and C will be respectively displayed in the participant display areas 1022, 1023 and 1024, while the display area for displaying participant multimedia data of the participant D will be pushed so far that the participant multimedia data cannot be displayed in a current interface. In most cases, for example, when the user selects the area 1022 using a mouse, the position of the mouse will continue to be within the region 1022. When the user wants to release separate amplified viewing of the selected multimedia data of the participant B, i.e., when the user wants to stop viewing the selected multimedia data of the participant B separately and wants to present the shared content in the shared content display area 101, the user needs to move the mouse to the designated independent area 1021 within the participant display area 102 where the shared content is currently presented and to perform a selecting operation (e.g., double-click). If the user does not move the mouse, since the mouse is still located in the area 1022, and the multimedia data of the participant A is currently presented in the region 1022, the multimedia data of the participant A will be presented in the shared content display area 101 if the user performs the selecting operation, which is obviously not desired by the user.

In summary, the traditional video conference interface interaction is not convenient enough to operate, does not meet the consistency of interaction, as well as crowding the display area of the multimedia data of the participants.

In order to solve the above-mentioned problems arising in the video conference interface interaction mode in the prior art, embodiments of the disclosure provide a video conference presentation method and apparatus, a terminal device and a storage medium. When content is shared during a video conference, the content presented in a selected participant display area and the content presented in a shared content display area are interchanged mutually, such that interaction modes between users and terminal devices in the video conference are enriched.

Figure 2:
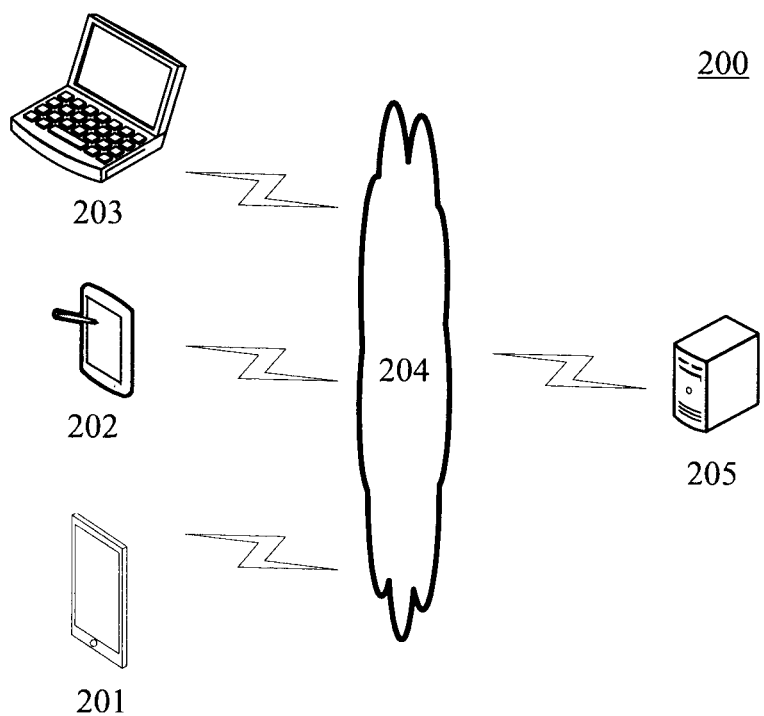
FIG. 2 shows an exemplary system architecture in which an embodiment of the disclosure can be applied.

FIG. 2 shows an exemplary system architecture 200 to which embodiments of the video conference presentation method and apparatus, the terminal device and the storage medium of the disclosure can be applied.

As shown in FIG. 2, the system architecture 200 may include terminal devices 201, 202, 203, a network 204, and a server 205. The network 204 is configured to provide a medium for communication links between the terminal devices 201, 202, 203 and the server 205. The network 204 may include a variety of connection types, such as a wired or wireless communication link or a fiber optic cable.

A user can use the terminal devices 201, 202, 203 to interact with the server 205 via the network 204 to receive or send messages, etc. The terminal devices 201, 202, 203 may have various communication client applications installed thereon, such as video conference applications, short video social applications, web browser applications, shopping applications, search applications, instant messenger tools, email clients, or social platform software.

The terminal devices 201, 202, 203 may be hardware or software. When being hardware, the terminal devices 201, 202, and 203 can be various terminal devices with a sound acquisition device (such as a microphone), a video acquisition device (such as a camera) and a display screen, including but not limited to smart phones, tablet computers, e-book readers, MP3 (Moving Picture Experts Group Audio Layer III (3)) players, MP4 (Moving Picture Experts Group Audio Layer IV (4)) players, laptop portable computers, desktop computers, and the like. When being software, the terminal devices 201, 202, 203 can be installed in the terminal devices listed above. The terminal devices can be implemented as a plurality of software or software modules (e.g., to provide a video conference presentation service) or implemented as single software or software module, which is not specifically limited here.

It is to be noted that the video conference presentation method provided in the disclosure is generally performed by the terminal devices 201, 202, 203, and accordingly, the video conference presentation apparatus can be provided in the terminal devices 201, 202, 203.

It is to be noted that the server 205 may be hardware or software. When being hardware, the server 205 may be implemented as a distributed server cluster composed of a plurality of servers, or implemented as a single server. When being software, the server 205 may be implemented as a plurality of software or software modules (e.g., to provide a distributed service) or implemented as single software or software module, which is not specifically limited here.

It should be understood that the numbers of the terminal devices, the network, and the server in FIG. 2 is only illustrative. There may be any number of terminal devices, network and server, as needed in implementation.

Figure 3:
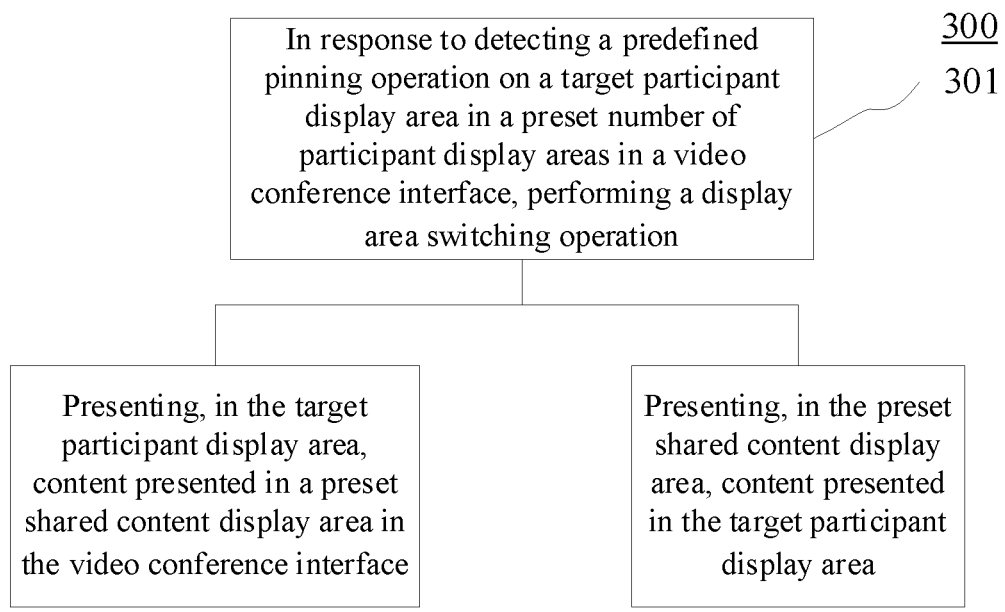
FIG. 3 is a flow chart of an embodiment of a video conference presentation method according to the disclosure.

Further referring to FIG. 3, which shows a process 300 of an embodiment of a video conference presentation method according to the disclosure. The video conference presentation method includes the following steps:

Step 301: in response to detecting a predefined pinning operation on a target participant display area in a preset number of participant display areas in a video conference interface, a display area switching operation is performed.

In this embodiment, an executor (e.g., terminal devices 201, 202, 203 shown in FIG. 2) of the video conference presentation method can perform a display area switching operation in response to detecting a predefined pinning operation on a target participant display area of a preset number of participant display areas in a video conference interface in the case where someone among participants shares content, after a video conference starts. The presenting area switching operation may include the following operations:

content presented in a preset shared content display area in the video conference interface is present in the target participant display area, and content presented in the target participant display area is presented in the preset shared content display area. That is, the presented contents of the preset shared content display area and the target participant display area are interchanged.

Usually, in the case where someone among participants shares content, the shared content is presented in the preset shared content display area in the video conference interface, and participant multimedia data is presented in the preset number of participant display areas. Here, if the participants turn on cameras, the participant multimedia data can be participant video streams acquired by the cameras, and if the participants do not turn on the cameras, the participant multimedia data can be participant avatars.

Here, the video conference interface may include a preset shared content display area and a preset number of participant display areas. An area of the preset shared content display area is greater than that of each of the participant display areas to facilitate amplified viewing in the shared content display area.

In some optional embodiments, the preset number of participant display areas can form an array of regions arranged adjacent to each other. For example, the preset number of participant display areas can form an array of regions in I rows and J columns, wherein regions in each row are aligned at a top end in a vertical direction, and regions in each column are aligned at a left side in a horizontal direction. I and J are positive integers.

The preset shared content display area and each participant display area can be of various shapes, which are not specifically limited in the disclosure. For example, the preset shared content display area and each participant display area can be of rectangles or rounded rectangles, etc.

In some optional embodiments, the area of the preset shared content display area can be greater than the sum of the areas of the preset number of participant display areas.

In some optional embodiments, the participant display areas can have the same shape and size.

Here, the shared content is used to characterize a video stream corresponding to the content shared currently in the video conference. It can be understood that the content shared currently in video conference may be shared by a participant corresponding to the above-mentioned executor using a terminal device, or shared by other participants using other terminal devices.

The preset number here may be a default number that is set in advance. The preset number may also be a number customized and input by a user as needed in an interface which is provided for setting the preset number.

It can be understood that there may be N participants currently in the video conference, and there may be a preset number M of participant display areas in the video conference interface to present participant multimedia data, wherein N and M are positive integers. If N is greater than M, then multimedia data of M participants will be displayed in the video conference interface, while multimedia data of the other (N-M) participants cannot be presented in the video conference interface. Of course, it is also possible to provide, in the video conference interface, an operation object for changing or selecting participants presented in the video conference interface, such as a down or up arrow icon. If N is less than or equal to M, then multimedia data of the N participants will be displayed in the current video conference interface, i.e., multimedia data of all the participants can be displayed in the video conference interface.

Here, the target participant display area can be any participant display area in the preset number of participant display areas.

The predefined pinning operation (also called pin operation) for the target participant display area can be various preset operations for triggering a display area switching operation. For example, the predefined pinning operation may be that a swipe or movement track of a mouse within the target participant display area is a preset track (e.g., circle), etc.

In some optional embodiments, the predefined pinning operation on the target participant display area includes at least one of: a click (e.g., single-click or double-click) operation on the target participant display area, such as single-click with a left mouse button or single-click with a right mouse button or single-click on a touch screen within the target participant display area, or double-click with a left mouse button or double-click with a right mouse button or double-click on a touch screen within the target participant display area; a swiping operation from the target participant display area to the preset shared content display area; and a swiping operation from the preset shared content display area to the target participant display area.

In some optional embodiments, specifically, the above-mentioned display area switching operation may be any one of the following three switching operations:

A first switching operation: presenting, in the target participant display area, shared content presented in the preset shared content display area, and presenting, in the preset shared content display area, participant multimedia data presented in the target participant display area.

That is, before the predefined pinning operation is detected, shared content is presented in the preset shared content display area, i.e., the shared content is displayed in an amplified manner, and participant multimedia data is presented in the target participant display area. After the predefined pinning operation on the target participant display area is detected, the participant multimedia data originally presented in the target participant display area is displayed in an amplified manner, and the currently shared content is presented in the target participant display area.

A second switching operation: presenting, in the target participant display area, participant multimedia data presented in the preset shared content display area, and presenting, in the preset shared content display area, shared content presented in the target participant display area.

That is, before the predefined pinning operation is detected, multimedia data of a participant is displayed in an amplified manner in the preset shared content display area, and shared content is presented in the target participant display area. After the predefined pinning operation on the target participant display area is detected, the shared content is displayed in an amplified manner in the preset shared content display area, and the multimedia data of the participant originally presented in the preset shared content display area will no longer be displayed in an amplified manner, but be presented in the target participant display area.

A third switching operation: presenting, in the target participant display area, first participant multimedia data presented in the preset shared content display area, and presenting, in the preset shared content display area, second participant multimedia data presented in the target participant display area.

That is, before the predefined pinning operation is detected, first participant multimedia data is displayed in an amplified manner in the preset shared content display area, and second participant multimedia data is presented in the target participant display area. After the predefined pinning operation on the target participant display area is detected, the second participant multimedia data is displayed in an amplified manner in the preset shared content display area, and the first participant multimedia data originally presented in the preset shared content display area will no longer be displayed in an amplified manner, but be presented in the target participant display area.

Further referring to FIG. 4, FIGS. 4A to 4C are schematic diagrams of application scenarios of a video conference presentation method according to this embodiment. In the application scenario of FIG. 4A, shared content is displayed in a shared content display area 401, and participant multimedia data of four participants A, B, C and D are respectively displayed in participant display areas 4021, 4022, 4023 and 4024 in a region 402.

Figure 4A:
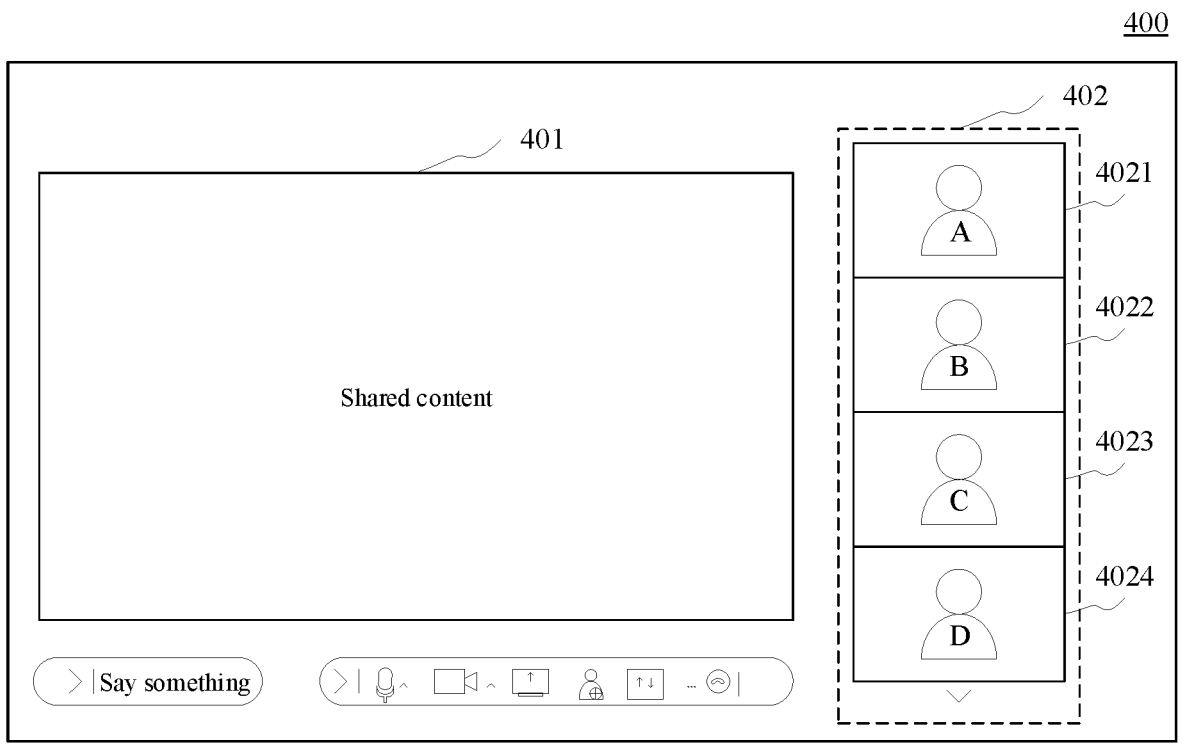
FIGS. 4A to 4D are schematic diagrams of application scenarios of a video conference presentation method according to the disclosure.
Figure 4B:
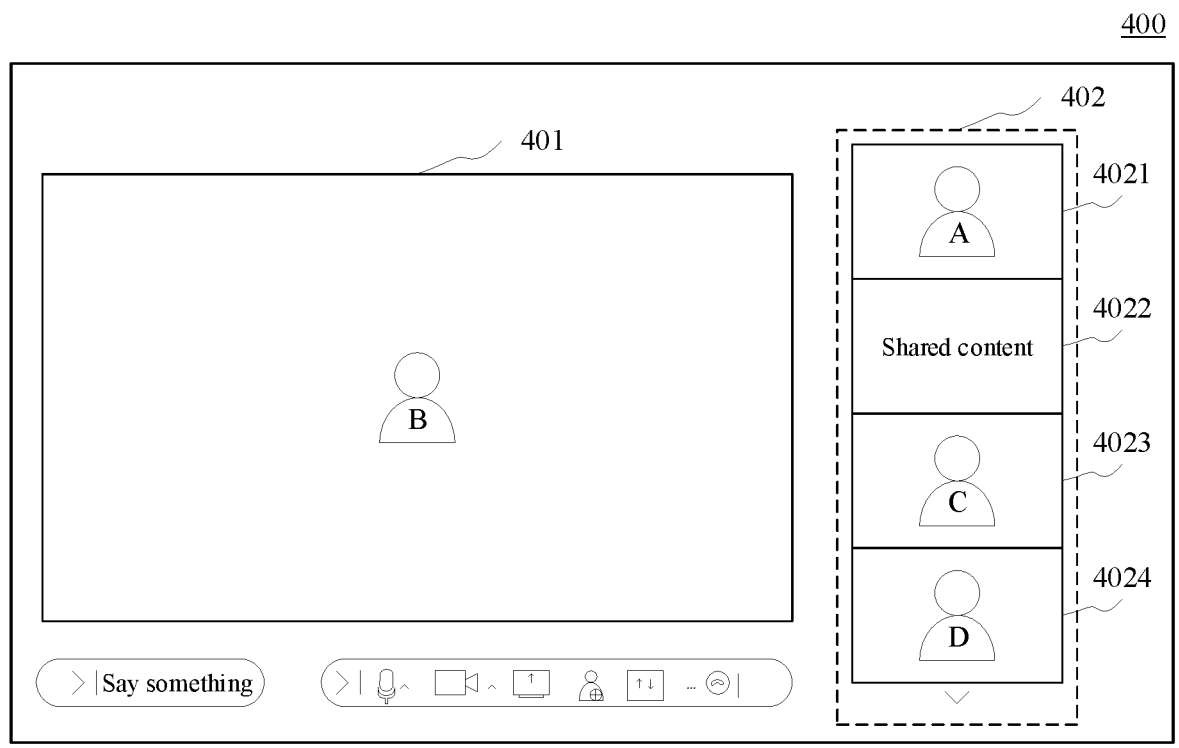

When a user wants to display the multimedia data of the participant B in an amplified manner, the user can perform a predefined pinning operation (e.g., double-click) on the region 4022 where the multimedia data of the participant B is displayed, such that as shown in FIG. 4B, the position for the multimedia data of the participant B and the position for the shared content will be interchanged for displaying, i.e., the multimedia data of the participant B will be displayed in the shared content display area 401 where the shared content was displayed previously, and the shared content will be displayed in the participant display area 4022 where the multimedia data of the participant B was displayed originally. That is, the above-mentioned first switching operation is implemented.

Figure 4C:
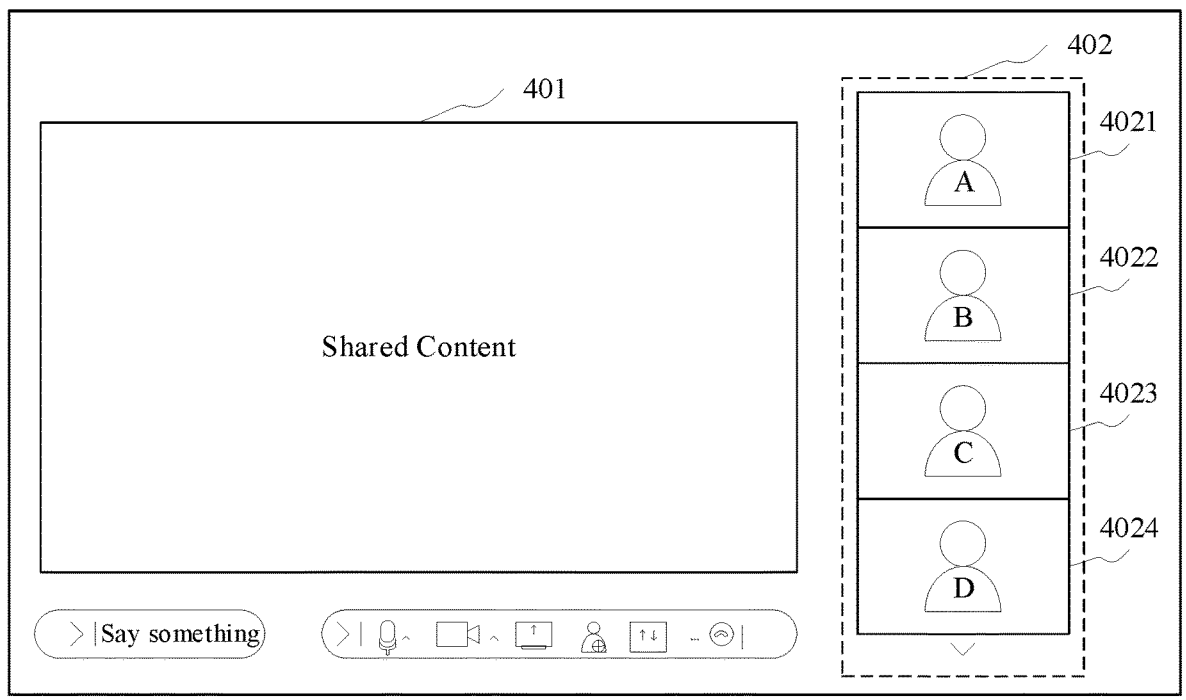

In the scenario shown in FIG. 4B, when the user wants to release the amplified displaying of the multimedia data of the participant B, i.e., when the user wants to resume amplified displaying of the shared content, the user only needs to perform a predefined pinning operation (e.g., double-click) on the participant display area 4022 where the multimedia data of the participant B was originally positioned, without moving the position of the mouse or finger, such that as shown in FIG. 4C, the position for the multimedia data of the participant B and the position for the shared content will be interchanged for displaying, i.e., the multimedia data of the participant B will be displayed in the participant display area 4022 where the multimedia data of the participant B was originally displayed, and the shared content will be displayed in the shared content display area 401 where the shared content was originally displayed. That is, the second switching operation is implemented.

Figure 4D:
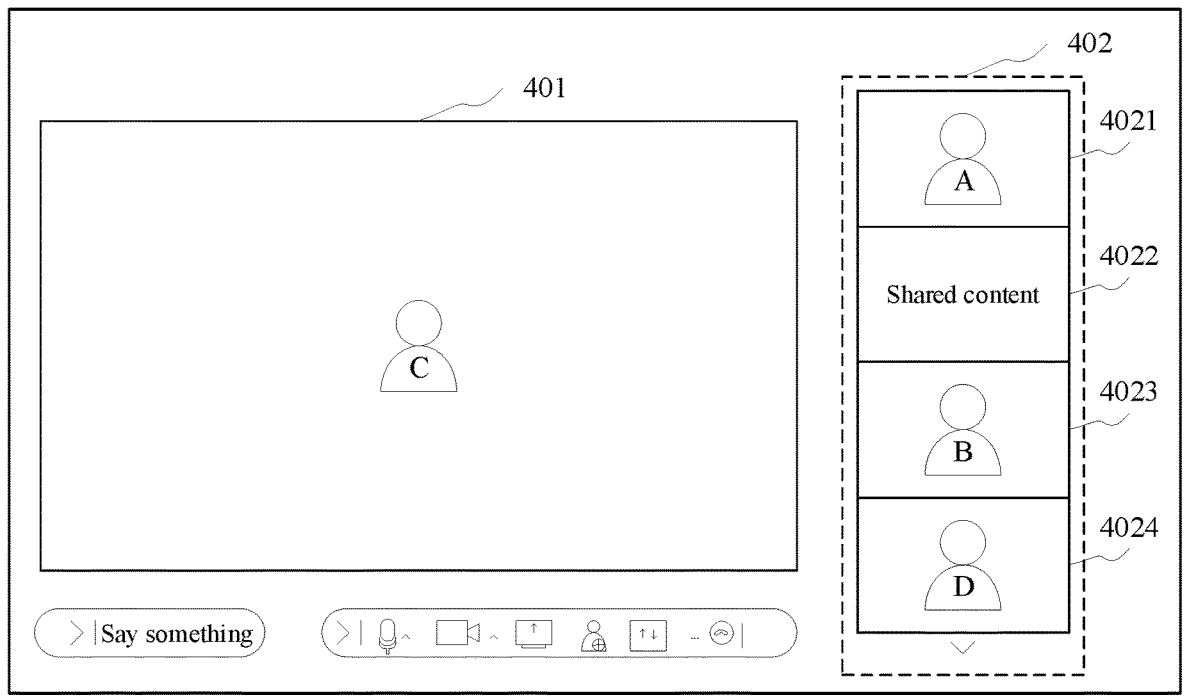

In the scenario shown in FIG. 4B, when the user wants to stop displaying the multimedia data of the participant B in an amplified manner, but wants to display the multimedia data of the participant C separately, the user can move the mouse or finger to the participant display area 4023 where the multimedia data of the participant C is located to perform a predefined pinning operation (e.g., double-click), such that as shown in FIG. 4D, the position for the multimedia data of the participant B and the position for the multimedia data of the participant C will be interchanged for displaying, i.e., the multimedia data of the participant B will be displayed in the participant display area 4023 where the multimedia data of the participant C was presented, and the multimedia data of the participant C will be displayed in the shared content display area 401. That is, the third switching operation is implemented.

In the video conference presentation method provided in the above embodiment of the disclosure, when content is shared during a video conference, a display area for a participant video stream selected for separate amplified presentation and a display area for a shared content video stream are interchanged mutually, thereby achieving the technical effects including, but not limited to the contents as follows:

First, interaction modes between users and terminal devices in a video conference are enriched.

Second, after selecting a participant display area for separate amplified presentation, the user can release the amplified presentation of the participant by performing a predefined pinning operation again on the original region without moving the mouse, and switches back to the scenario of displaying the shared content in the shared content display area, which achieves a shorter interaction path and more conformity to the intuition of users.

Third, the display area for the participant multimedia data selected for separate amplified presentation and the display area for the shared content are interchanged mutually, instead of designating an additional participant display area for displaying the shared content, and no changes are made to other display areas of participant multimedia data that have not been selected for amplified presentation so that the participant multimedia data is less affected, thereby reducing disturbance to users, and improving the users' visual perception for the entire interface.

Figure 5:
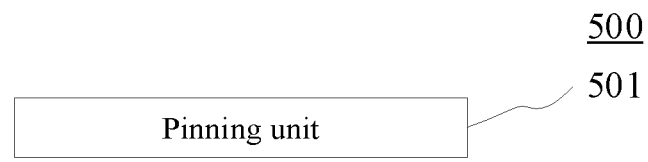
FIG. 5 is a schematic structural diagram of an embodiment of a video conference presentation apparatus according to the disclosure.

Further referring to FIG. 5, as an implementation of the method shown in the FIGS. described above, the disclosure provides an embodiment of a video conference presentation apparatus. This apparatus embodiment corresponds to the method embodiment shown in FIG. 3, and the apparatus can be specifically applied in various terminal devices.

As shown in FIG. 5, the video conference presentation apparatus 500 of this embodiment includes a pinning unit 501. The pinning unit 501 is configured to, in response to detecting a predefined pinning operation on a target participant display area of a preset number of participant display areas in a video conference interface, perform display area switching operation as follows: presenting, in the above-mentioned target participant display area, content currently presented in the preset shared content display area in the above-mentioned video conference interface; and presenting, in the above-mentioned preset shared content display area, content currently presented in the above-mentioned target participant display area.

In this embodiment, for specific processing of the pinning unit 501 of the video conference presentation apparatus 500 and technical effects thereof, reference can be made to the relevant description of step 301 in the corresponding embodiment of FIG. 3, respectively, which will not be repeated here.

In some optional embodiments, the above-mentioned display area switching operation may include: presenting, in the above-mentioned target participant display area, shared content currently presented in the above-mentioned preset shared content display area, and presenting, in the above-mentioned preset shared content display area, participant multimedia data currently presented in the above-mentioned target participant display area; or presenting, in the above-mentioned target participant display area, participant multimedia data currently presented in the above-mentioned preset shared content display area, and presenting, in the above-mentioned preset shared content display area, shared content currently presented in the above-mentioned target participant display area; or presenting, in the above-mentioned target participant display area, first participant multimedia data currently presented in the above-mentioned preset shared content display area, and presenting, in the above-mentioned preset shared content display area, second participant multimedia data currently presented in the above-mentioned target participant display area.

In some optional embodiments, the above-mentioned predefined pinning operation and the above-mentioned preset pinning release operation can be any of: double-click, single-click, a slide or movement track being a preset track.

In some optional embodiments, the above-mentioned preset number of participant display areas can form an array of regions arranged adjacent to each other.

In some optional embodiments, the area of the above-mentioned preset shared content display area can be greater than the sum of the areas of the above-mentioned preset number of participant display areas.

In some optional embodiments, the area of the above-mentioned preset shared content display area can be greater than the area of each of the above-mentioned participant display areas.

In some optional embodiments, the above-mentioned participant display areas can have the same shape and size.

It is to be noted that for implementation details and technical effects of units in the video conference presentation apparatus provided in the embodiments of the disclosure, reference can be made to the description of other embodiments in the disclosure, which will not be repeated here.

Figure 6:
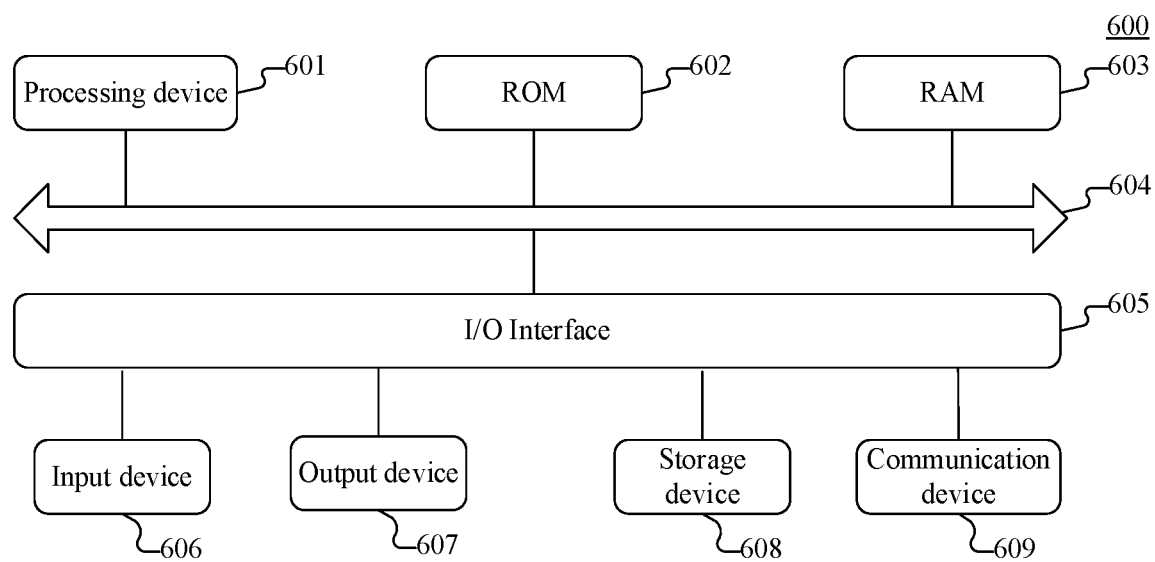
FIG. 6 is a schematic structural diagram of a computer system configured to implement a terminal device of an embodiment of the disclosure.

Referring now to FIG. 6, a structural schematic diagram of computing system 600 suitable for implementing an embodiment of the disclosure is shown. The computing system 600 shown in FIG. 6 is only an example, and should not bring any restrictions on the functions and application scope of the embodiments of the present disclosure.

As shown in FIG. 6, the computing system 600 can comprise a processing device (e.g., central processing unit, graphics processor, etc.) 601, which can perform various appropriate actions and processing according to a program stored in a read-only memory (ROM) 602 or a program loaded into a random access memory (RAM) 603 from a storage device 608. In the RAM 603, various programs and data required for the operation of the computing system 600 are also stored. The processing device 601, the ROM 602, and the RAM 603 are connected through a bus 604. An Input/Output (I/O) interface 605 is also connected to the bus 604.

Generally, the following devices can be connected to the I/O interface 605: an input device 606 such as a touch screen, a touch pad, a keyboard, a mouse, a camera, a microphone, an accelerometer, and a gyroscope; an output device 607 such as a liquid crystal display (LCD), a speaker and a vibrator; a storage device 608 such as a magnetic tape and a hard disk; and a communication device 609. The communication device 609 can allow the computing system 600 to perform wireless or wired communication with other equipment to exchange data. Although FIG. 6 shows the computing system 600 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure comprise a computer program product comprising a computer program carried by a computer-readable medium, and the computer program contains program codes for executing the method shown in the flowcharts. In such embodiment, the computer program can be downloaded and installed from a network through the communication device 609, or installed from the storage device 608, or installed from the ROM 602. When the computer program is executed by the processing device 601, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device, or component. In the disclosure, the computer-readable signal medium can comprise a data signal propagated in a baseband or as part of a carrier wave, in which computer-readable program codes are carried. This propagated data signal can take various forms, including but not limited to an electromagnetic signal, an optical signal, or any suitable combination of the above. The computer-readable signal medium can also be any computer-readable medium other than the computer-readable storage medium, and the computer-readable signal medium can send, propagate, or transmit the program for use by or in connection with the instruction execution system, device, or component. The program codes contained in the computer-readable medium can be transmitted by any suitable medium, including but not limited to electric wire, optical cable, radio frequency (RF) or any suitable combination of the above.

The computer-readable medium can be included in the terminal equipment, and can also exist alone without being assembled into the terminal equipment.

The computer-readable medium carries one or more programs, and when the one or more programs are executed by the terminal equipment, the terminal equipment is caused to perform the video conference presentation method shown in the embodiment shown in FIG. 3 and its optional embodiments.

Computer program codes for performing the operations of the disclosure can be written in one or more programming languages or a combination thereof, including object-oriented programming languages such as JAVA®, SMALL-TALK®, C++, and conventional procedural programming languages such as "C" language or similar programming languages. The program code can be completely or partially executed on a user computer, executed as an independent software package, partially executed on a user computer, and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions, and operations of possible implementations of systems, methods, and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The name of a module or unit does not constitute a limitation to the module or unit itself under certain circumstances. For example, the pinning unit can also be described as "a unit for performing, in response to detecting a predefined pinning operation on a target participant display area of a preset number of participant display areas in a video conference interface, a display area switching operation as follows".

The above description is only a preferred embodiment of the present disclosure and an illustration of the technical principles employed. It should be understood by those skilled in the art that the scope of the disclosure covered by the embodiments of the present disclosure is not limited to technical solutions resulting from particular combinations of the technical features described above, but should also cover other technical solutions resulting from any combination of the technical features described above or their equivalents without departing from the above conception of the present disclosure, such as technical solutions resulting from the interchangeability of the above features with technical features having similar functions disclosed in (but not limited to) the embodiments of the present disclosure.

What is claimed is:

1. A method of presenting a video conference, comprising:
   displaying shared content in a first region of a video conference interface;
   detecting a first predefined pinning operation on a first target participant display area among a plurality of participant display areas in a second region of the video conference interface, wherein data associated with a plurality of participants of the video conference are displayed in the plurality of participant display areas, respectively, and wherein the first target participant display area corresponds to a first participant among the plurality of participants of the video conference;
   switching to displaying the shared content in the first target participant display area in response to detecting the first predefined pinning operation on the first target participant display area, wherein the shared content comprises content currently shared in the video conference by any of the plurality of participants with other participants;
   switching to displaying data associated with the first participant of the video conference in the first region in which the shared content was displayed in response to detecting the first predefined pinning operation on the first target participant display area;
   detecting a second predefined pinning operation on a second target participant display area while displaying the shared content in the first target participant display area and displaying the data associated with the first participant in the first region, wherein the second target participant display area is among the plurality of participant display areas, and wherein the second target participant display area corresponds to a second participant among the plurality of participants of the video conference; and
   in response to detecting the second predefined pinning operation, switching to displaying the data associated with the first participant of the video conference in the second target participant display area and switching to displaying the data associated with the second participant of the video conference in the first region while maintaining the shared content in the first target participant display area.

2. The method according to claim 1, further comprising:
   presenting, in the first target participant display area, the shared content that was presented in the first region, and presenting, in the first region, participant multimedia data that was presented in the first target participant display area; or
   presenting, in the first target participant display area, participant multimedia data that was presented in the first region, and presenting, in the first region, the shared content that was presented in the first target participant display area; or
   presenting, in the first target participant display area, first participant multimedia data that was presented in the first region, and presenting, in the first region, second participant multimedia data that was presented in the first target participant display area.

3. The method according to claim 2, wherein the first predefined pinning operation comprises at least one of:
   a click operation on the first target participant display area;
   a swiping operation from the first target participant display area to the first region; and
   a swiping operation from the first region to the first target participant display area.

4. The method according to claim 1, wherein the plurality of participant display areas form an array of areas arranged adjacent to each other.

5. The method according to claim 1, wherein the first region is greater than a sum of the plurality of participant display areas.

6. The method according to claim 1, wherein the first region is greater than each of the plurality of participant display areas.

7. The method according to claim 1, wherein the plurality of participant display areas each have the same shape and size.

8. A video conference presentation apparatus, comprising:
   at least one processor; and
   at least one memory communicatively coupled to the at least one processor and storing instructions that upon execution by the at least one processor cause the apparatus to perform operations comprising:
   displaying shared content in a first region of a video conference interface;
   detecting a first predefined pinning operation on a first target participant display area among a plurality of participant display areas in a second region of the video conference interface, wherein data associated with a plurality of participants of the video conference are displayed in the plurality of participant display areas, respectively, and wherein the first target participant display area corresponds to a first participant among the plurality of participants of the video conference;
   switching to displaying the shared content in the first target participant display area in response to detecting the first predefined pinning operation on the first target participant display area, wherein the shared content comprises content currently shared in the video conference by any of the plurality of participants with other participants;

switching to displaying data associated with the first participant of the video conference in the first region in which the shared content was displayed in response to detecting the first predefined pinning operation on the first target participant display area;

detecting a second predefined pinning operation on a second target participant display area while displaying the shared content in the first target participant display area and displaying the data associated with the first participant in the first region, wherein the second target participant display area is among the plurality of participant display areas, and wherein the second target participant display area corresponds to a second participant among the plurality of participants of the video conference; and in response to detecting the second predefined pinning operation, switching to displaying the data associated with the first participant of the video conference in the second target participant display area and switching to displaying the data associated with the second participant of the video conference in the first region while maintaining the shared content in the first target participant display area.

9. A non-transitory computer readable storage medium with a computer program, storing program instructions that upon execution by one or more processors, cause the one or more processors to perform operations comprising:

displaying shared content in a first region of a video conference interface;

detecting a first predefined pinning operation on a first target participant display area among a plurality of participant display areas in a second region of the video conference interface, wherein data associated with a plurality of participants of the video conference are displayed in the plurality of participant display areas, respectively, and wherein the first target participant display area corresponds to a first participant among the plurality of participants of the video conference;

switching to displaying the shared content in the first target participant display area in response to detecting the first predefined pinning operation on the first target participant display area, wherein the shared content comprises content currently shared in the video conference by any of the plurality of participants with other participants;

switching to displaying data associated with the first participant of the video conference in the first region in which the shared content was displayed in response to detecting the first predefined pinning operation on the first target participant display area;

detecting a second predefined pinning operation on a second target participant display area while displaying the shared content in the first target participant display area and displaying the data associated with the first participant in the first region, wherein the second target participant display area is among the plurality of participant display areas, and wherein the second target participant display area corresponds to a second participant among the plurality of participants of the video conference; and in response to detecting the second predefined pinning operation, switching to displaying the data associated with the first participant of the video conference in the second target participant display area and switching to displaying the data associated with the second participant of the video conference in the first region while maintaining the shared content in the first target participant display area.

* * * * *